United States Patent
Zhou et al.

(10) Patent No.: US 7,206,439 B2
(45) Date of Patent: Apr. 17, 2007

(54) FEATURE LOCATIONS IN ARRAY READING

(75) Inventors: Xiangyang Zhou, Mountain View, CA (US); Charles D. Troup, Livermore, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 814 days.

(21) Appl. No.: 10/427,850

(22) Filed: Apr. 30, 2003

(65) Prior Publication Data

US 2004/0218795 A1 Nov. 4, 2004

(51) Int. Cl.
*G06K 9/00* (2006.01)
(52) U.S. Cl. ..................................................... 382/129
(58) Field of Classification Search ........ 382/128–129, 382/151, 291; 702/19–20
See application file for complete search history.

(56) References Cited

U.S. PATENT DOCUMENTS

| | | | |
|---|---|---|---|
| 6,349,144 B1 | 2/2002 | Shams | |
| 6,990,221 B2 * | 1/2006 | Shams | ......................... 382/129 |
| 2002/0193962 A1 | 12/2002 | Yakhini et al. | |
| 2002/0195554 A1 | 12/2002 | Staton et al. | |

FOREIGN PATENT DOCUMENTS

| | | |
|---|---|---|
| GB | 2319838 A | 6/1998 |
| WO | WO 99/08233 | 2/1999 |
| WO | WO 01/06395 | 1/2001 |

OTHER PUBLICATIONS

Eisen "ScanAlyze User Manual" Stanford University, 1998-1999, pp. 1-27.*

* cited by examiner

*Primary Examiner*—Daniel Miriam

(57) ABSTRACT

Feature locations are determined in an array image obtained from reading a chemical array comprising multiple features arranged in a polygon and which array optionally includes sub-arrays within the array. A complete image of the array or a sub-array is presented on a display. Magnified images of corner regions of the displayed complete image are simultaneously presented on the display with the complete image. A user selection of corners for the array or sub-array are received and an array or sub-array actual outline is generated by linearly connecting the user selected corners. The generated actual outline is presented on the magnified image and may also be simultaneously presented on the complete image. Feature locations in the array or sub-array image may be determined based on the actual outline.

19 Claims, 5 Drawing Sheets

FEATURE LOCATIONS IN ARRAY READING

FIELD OF THE INVENTION

This invention relates to arrays, particularly polynucleotide arrays such as DNA arrays, which are useful in diagnostic, screening, gene expression analysis, and other applications.

BACKGROUND OF THE INVENTION

Biopolymer arrays such as polynucleotide arrays (for example, DNA or RNA arrays), are known and are used, for example, as diagnostic or screening tools. Such arrays include regions of usually different sequence polynucleotides arranged in a predetermined configuration on a substrate. These regions (sometimes referenced as "features") are positioned at respective locations ("addresses") on the substrate. The arrays, when exposed to a sample, will exhibit an observed binding pattern. This binding pattern can be detected upon interrogating the array. For example all polynucleotide targets (for example, DNA) in the sample can be labeled with a suitable label (such as a fluorescent compound), and the fluorescence pattern on the array accurately observed following exposure to the sample. Assuming that the different sequence polynucleotides were correctly deposited in accordance with the predetermined configuration, then the observed binding pattern will be indicative of the presence and/or concentration of one or more polynucleotide components of the sample.

Biopolymer arrays can be fabricated by depositing previously obtained biopolymers onto a substrate, or by in situ synthesis methods. The in situ fabrication methods include those described in U.S. Pat. No. 5,449,754 for synthesizing peptide arrays, and in U.S. Pat. No. 6,180,351 and WO 98/41531 and the references cited therein for synthesizing polynucleotide arrays. Further details of fabricating biopolymer arrays are described in U.S. Pat. No. 6,242,266, U.S. Pat. No. 6,232,072, U.S. Pat. No. 6,180,351, and U.S. Pat. No. 6,171,797. Other techniques for fabricating biopolymer arrays include known light directed synthesis techniques.

In array fabrication, the probes formed at each feature is usually are expensive. Additionally, sample quantities available for testing are usually also very small and it is therefore desirable to simultaneously test the same sample against a large number of different probes on an array. These conditions make it desirable to produce arrays with large numbers of very small (for example, in the range of tens or one or two hundred microns), closely spaced features (for example many thousands of features). After an array has been exposed to a sample, the array is read with a reading apparatus (such as an array "scanner") which detects the signals (such as a fluorescence pattern) from the array features. Such a reader should typically have a very fine resolution (for example, in the range of five to twenty microns).

The array image resulting from reading the array can then be digitally processed to evaluate which regions (pixels) of read data belong to a given feature as well as the total signal strength from each of the features. The foregoing steps, separately or collectively, are referred to as "feature extraction". However, the signal from many pixels may be so low that it is difficult to decide whether a given pixel belongs to a given feature without having knowledge of the location of that feature in the image. This can be a difficult task since in any batch of even the same arrays, features may be displaced to some small degree relative to each other, the exact array positioning on a substrate may vary slightly, or the positioning of the substrate in a reader may vary slightly. Any of these conditions can cause features to be displaced in the array image from an expected location. Thus, in some procedures for accurately determining feature locations in the image, user input is required to accurately pinpoint on a display of the image at least some features from which the locations of other features can be deduced. For example, the user may be asked to select a center point of corner features in the array image. However, since an array can easily contain ten thousand or more features, the features on a complete image of the array on a typical display will appear as points at best, or worse will not even be visible. This makes user pinpointing of a location of some features in the displayed image, such as by selecting the center of corner features, difficult and prone to error. Of course, a user can zoom in on a portion of the array image, pinpoint a feature location (such as a feature center), zoom out, zoom in on another portion of the image, pinpoint another feature location, then repeat this tedious procedure as often as needed.

It would be desirable then, in determining feature locations in an array image where user input is required to accurately pinpoint locations of some features, to provide a means which does not require a large number of tedious steps from the user.

SUMMARY OF THE INVENTION

The present invention then, provides in one aspect a computer implemented method of determining feature locations in an array image obtained from reading a chemical array. Such a chemical array has multiple features arranged in a polygon (for example, a rectangle) and which array optionally includes sub-arrays within the array. The method includes presenting on a display a complete image of the array or a sub-array. Magnified images of corner regions of the array or sub-array are presented on a display. These may be presented on the display simultaneously with a complete image of the array or sub-array. A user selection of corners of the array or sub-array is received and an array or sub-array actual outline is generated in which the user selected corner points are linearly connected. The generated actual outline is presented on the displayed magnified images and may also be presented simultaneously on the displayed complete image. Feature locations in the array or sub-array image may be determined based on the actual outline.

The present invention further provides in another aspect an apparatus for determining feature locations in an array image obtained from reading the chemical array. The apparatus includes a computer programmed to execute a method of the present invention. In a still further aspect, the present invention provides a computer program product including a computer readable medium carrying a computer program code which performs a method of the present invention.

Different embodiments of the present invention can provide any one or more of the following or other useful benefits. For example, feature locations in an array image can be determined based on a required user input to accurately pinpoint locations of some features, without requiring a large number of tedious steps from the user.

BRIEF DESCRIPTION OF THE DRAWINGS

Embodiments of the invention will now be described with reference to the following drawings in which.

Figure 1:
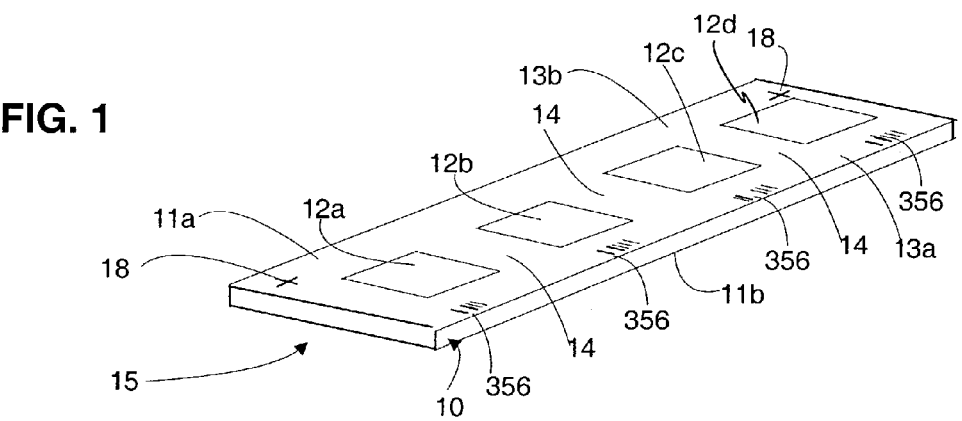
FIG. 1 illustrates a substrate carrying multiple arrays, such as may be read by a method of the present invention.

To facilitate understanding, identical reference numerals have been used, where practical, to designate the same elements which are common to different figures. Drawings are not necessarily to scale. Throughout this application any different members of a generic class may have the same reference number followed by different letters (for example, arrays 12a, 12b, 12c, and 12d may generically be referenced as "arrays 12")

DETAILED DESCRIPTION OF EMBODIMENTS OF THE INVENTION

Throughout the present application, unless a contrary intention appears, the following terms refer to the indicated characteristics.

A "biopolymer" is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. Specifically, a "biopolymer" includes DNA (including cDNA), RNA and oligonucleotides, regardless of the source.

A "biomonomer" references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides.

An "oligonucleotide" generally refers to a nucleotide multimer of about 10 to 100 nucleotides in length, while a "polynucleotide" includes a nucleotide multimer having any number of nucleotides.

An "array", unless a contrary intention appears, includes any one, two or three-dimensional arrangement of addressable regions bearing a particular chemical moiety or moieties (for example, biopolymers such as polynucleotide sequences) associated with that region. Each region may extend into a third dimension in the case where the substrate is porous while not having any substantial third dimension measurement (thickness) in the case where the substrate is non-porous. An array is "addressable" in that it has multiple regions of different moieties (for example, different polynucleotide sequences) such that a region (a "feature" or "spot" of the array) at a particular predetermined location (an "address") on the array will detect a particular target or class of targets (although a feature may incidentally detect non-targets of that feature). An array feature is generally homogenous and the features typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probes" may be the one which is to be evaluated by the other (thus, either one could be an unknown mixture of polynucleotides to be evaluated by binding with the other). A complete array may be considered to be a group of features. An array may have sub-groups of features which are spaced apart from one another or are spaced apart more than an average inter-feature spacing (if any) within those sub-groups, so as to form sub-groups which are distinct when viewed in an image of the array (enlarged sufficiently so a human eye can see the difference in spacing between sub-groups versus between features). Such sub-groups are referenced herein as "sub-arrays" of the array. Alternatively, there may be no such sub-arrays such as when all the features of the array are regularly spaced from one another. Arrays with no such sub-arrays may be referenced as "continuous" arrays.

An "array layout" or "array characteristics", refers to one or more physical, chemical or biological characteristics of the array, such as positioning of some or all the features within the array and on a substrate, one or more feature dimensions, or some indication of an identity or function (for example, chemical or biological) of a moiety at a given location, or how the array should be handled (for example, conditions under which the array is exposed to a sample, or array reading specifications or controls following sample exposure).

"Hybridizing" and "binding", with respect to polynucleotides, are used interchangeably.

A "plastic" is any synthetic organic polymer of high molecular weight (for example at least 1,000 grams/mole, or even at least 10,000 or 100,000 grams/mole.

"Flexible" with reference to a substrate or substrate web, references that the substrate can be bent 180 degrees around a roller of less than 1.25 cm in radius. The substrate can be so bent and straightened repeatedly in either direction at least 100 times without failure (for example, cracking) or plastic deformation. This bending must be within the elastic limits of the material. The foregoing test for flexibility is performed at a temperature of 20° C.

A "web" references a long continuous piece of substrate material having a length greater than a width. For example, the web length to width ratio may be at least 5/1, 10/1, 50/1, 100/1, 200/1, or 500/1, or even at least 1000/1.

When one item is indicated as being "remote" from another, this is referenced that the two items are at least in different buildings, and may be at least one mile, ten miles, or at least one hundred miles apart. When different items are indicated as being "local" to each other, they are at least in the same building and may be in the same room of a building. "Communicating", "transmitting" and the like, reference conveying data representing information as electrical or optical signals over a suitable communication channel (for example, a private or public network, wired, optical fiber, wireless, or otherwise). Any communication or transmission can be between devices which are local or remote from one another. "Forwarding" an item refers to any means of getting that item from one location to the next, whether by physically transporting that item or using other known methods (where that is possible) and includes, at least in the case of data, physically transporting a medium carrying the data or communicating the data over a communication channel (including electrical, optical, or wireless). "Receiving" something means it is obtained by any possible means, such as delivery of a physical item (for example, an array or array carrying package). When information is received it may be obtained as data as a result of a transmission (such as by electrical or optical signals over any communication channel of a type mentioned herein), or it may be obtained as electrical or optical signals from reading some other medium (such as a magnetic, optical, or solid state storage device) carrying the information. However, when information is received from a communication it is received as a result of a transmission of that information from elsewhere (local or remote).

When two items are "associated" with one another they are provided in such a way that one unambiguously references the other. In particular, an array identifier can be associated with an array by being on the same substrate that carries the array or on or in a package or kit carrying the array. One item of data is "linked" to another when an input of one item unambiguously retrieves the other. In particular, when an array layout is "linked" with an identifier for that array, then an input of the identifier into a processor which accesses a memory carrying the linked array layout unambiguously retrieves the array layout for that array.

A "computer", "processor" or "processing unit" are used interchangeably and each references any combination of hardware or software which can control components as required to execute recited steps and includes. For example a computer, processor, or processor unit includes, for example, a general purpose digital microprocessor suitably programmed (for example, from a computer readable medium carrying necessary program code or by communication from a remote location) to perform all of the steps required of it, or any hardware or software combination which will perform those or equivalent steps.

A "memory" or "memory unit" refers to any device which can store information for retrieval by a processor, and may include magnetic, optical, or solid state memory devices. A memory or memory unit may have more than one actual memory device (for example, a memory may have multiple memory devices).

An array "assembly" may be the array plus only a substrate on which the array is deposited, although the assembly may be in the form of a package which includes other features (such as a housing with a chamber).

A "complete" image of a read array is an image showing the entire read array. A "complete" image need not be a full reproduction of all the data in the read image and in practice, when presented on a display, will typically be presented in magnified but reduced resolution form to fit entirely on a part of a typical display.

It will also be appreciated that throughout the present application, that words such as "front", "back", "top", "upper", and "lower" are used in a relative sense only.

"May" refers to optionally.

Any recited method can be carried out in the order of events recited or in any other order which is logically possible. Reference to a singular item, includes the possibility that there are plural of the same item present. All patents and other references cited in this application, are incorporated into this application by reference except insofar as anything in those patents or references, including definitions, conflicts with anything in the present application (in which case the present application is to prevail).

As already mentioned, the present invention may include in one aspect: (a) presenting on a display a complete image of the array or a sub-array; (b) presenting on the display simultaneously with the complete image of (a), magnified images of corner regions of the displayed complete image; (c) receiving a user selection of corners of the array or sub-array and generating an array or sub-array actual outline in which the user selected corners are linearly connected; (d) presenting the generated actual outline simultaneously on both the displayed image and the displayed magnified images; and (e) determining feature locations in the array or sub-array image based on the actual outline. In any method of the present invention magnified images of more than one and any number less than all of the corner regions of the displayed complete image could be presented simultaneously on the display with the complete image and used as described herein. However, generally a magnified image of each of the corner regions will be presented simultaneously on the display with the complete image and used as describe herein. For example, with a rectangular array (which also includes a square array), generally a magnified image of each of the four corner regions would be so presented and used.

Particular embodiments of the present invention may include, prior to (d) through (e): (i) reading an identifier associated with the array; (ii) retrieving an array layout based on the read identifier; (iii) generating, based on the array layout, an array or sub-array expected outline in which the expected location of corners of the array or sub-array image are linearly connected; and (iv) displaying the expected outline simultaneously in the complete image and in each of the magnified images of corner regions. Also, the determining feature locations may include generating a grid based on the actual outline and retrieved array layout and selecting locations in relation to the grid as feature locations.

The user selection may be received from a point and select device (such as a conventional mouse, track-ball, or pointing pad) by which the user points to and selects the user selected corner points in each of the magnified images. Alternatively, the user may enter locations by specifying one or more co-ordinates using, for example, a keypad. As another alternative, the user may drag and drop a displayed expected outline on the magnified images. In any event, the corners may be selected directly by pointing and clicking, entering co-ordinates, and the like, or indirectly such as by selecting locations of the lines on an expected or proposed outline (for example, by moving the lines and observing their new positioning in the magnified images). In situations where the array includes sub-arrays, the method may additionally include repeating (a) through (e) for each of the sub-arrays. Prior to (c) and (d), the method may also include: (i) reading an identifier associated with the array; (ii) retrieving an array layout based on the read identifier; (iii) generating, based on the array layout, a sub-array expected outline in which the expected location of corner points in the sub-array image are linearly connected; (iv) presenting the expected outline simultaneously in the complete image and in each of the magnified images of corner regions. Following (d), the method may further include repeating (iii) and (iv) and (a) through (d) for each of the sub-arrays in turn. Feature locations may be determined in (e) after each iteration or a number of iterations (such as all of them) have been completed. In another embodiment the method may include receiving a user selection of one of the sub-arrays prior to (c) through (e).

Embodiments of methods of the present invention may also include reading the array, and/or extracting feature data from the image based on the determined feature locations. The array image may be obtained from the reading of a chemical array comprising multiple features arranged in rows and columns. The image itself will have feature images arranged in the same pattern as the read array (for example, the rows and columns).

Apparatus of the present invention may include, in addition to the computer, an identifier reader to read an identifier associated with the array and/or an array reader to read the array.

Figure 2:
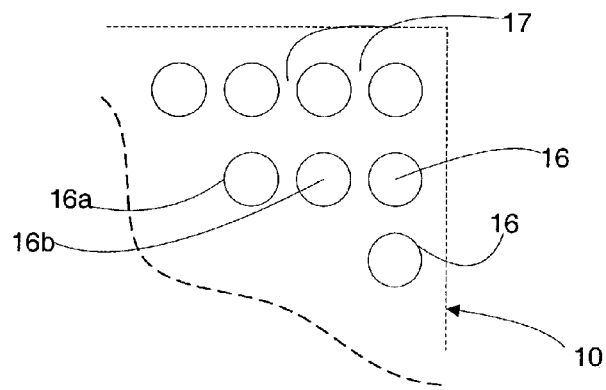
FIG. 2 is an enlarged view of a portion of FIG. 2 showing multiple spots or features of one array.
Figure 3:
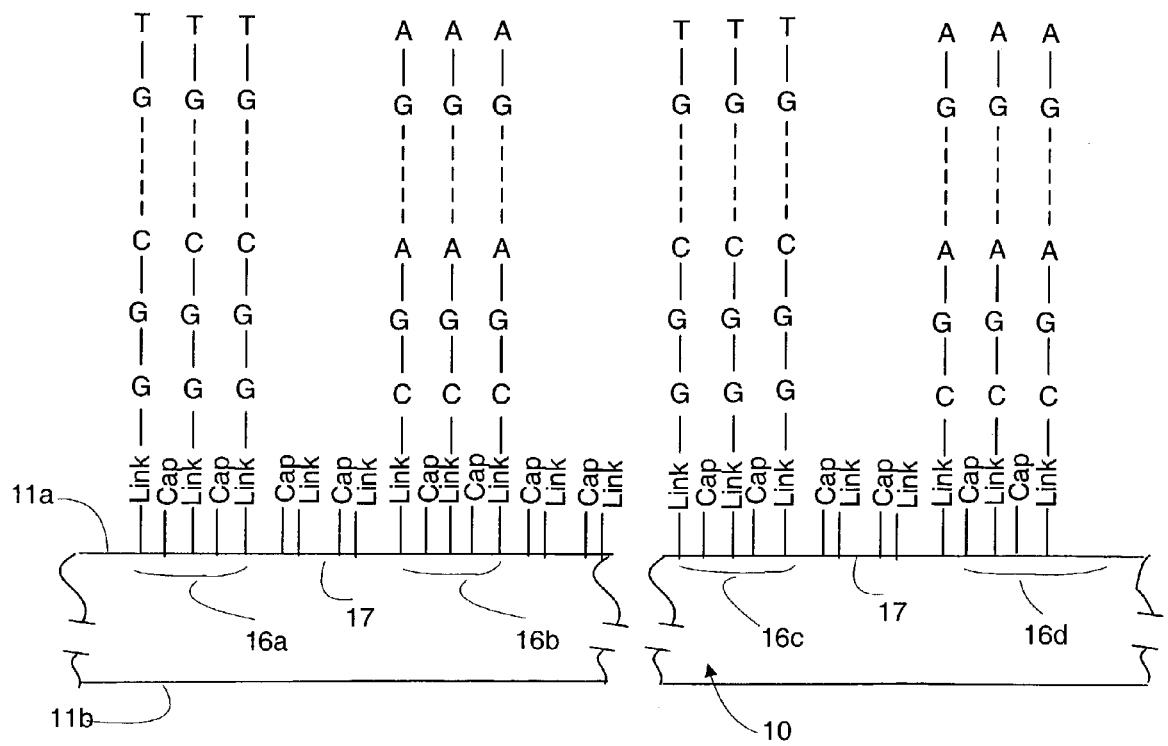
FIG. 3 is an enlarged illustration of a portion of the substrate of FIG. 1.

Referring now to FIGS. 1–3, an array assembly 15 (which may also be referenced as an "array unit") includes arrays 12 which may be read to obtain an array image used in methods of the present invention. Substrate 10 may also be in the form of an a rigid substrate 10 (for example, a transparent non-porous material such as glass or silica) of limited length, carrying one or more arrays 12 disposed along a front surface 11a of substrate 10 and separated by inter-array areas 14. Alternatively, substrate 10 can be flexible (such as a flexible web). The substrate may be of one material or of multi-layer construction. Substrate 10 is typically non-porous, and may be smooth or substantially planar, or have irregularities, such as depressions or elevations (although irregular substrate surfaces may make reading of the exposed array more difficult). A back side 11b of substrate 10 does not carry any arrays 12. The arrays on substrate 10 can be designed for testing against any type of sample, whether: a trial sample; reference sample; a combination of the foregoing; or a known mixture of polynucleotides, proteins, polysaccharides and the like (in which case the arrays may be composed of features carrying unknown sequences to be evaluated). While four arrays 12 are shown in FIG. 1, it will be understood that substrate 10 may use any number of desired arrays 12 such as at least one, two, five, ten, twenty, fifty, or one hundred (or even at least five hundred, one thousand, or at least three thousand). When more than one array 12 is present they may be arranged end to end along the lengthwise direction of substrate 10. Depending upon intended use, any or all of arrays 12 may be the same or different from one another and each will contain multiple spots or features 16 of biopolymers in the form of polynucleotides.

A typical array 12 may contain more than: ten, one hundred, one thousand, or ten thousand features. For example, features may have widths (that is, diameter, for a round spot) in the range from a 10 μm to 1.0 cm. In other embodiments each feature may have a width in the range of 1.0 μm to 1.0 mm, usually 5.0 μm to 500 μm, and more usually 10 μm to 200 μm. Non-round features may have area ranges equivalent to that of circular features with the foregoing width (diameter) ranges. At least some, or all, of the features are of different compositions (for example, when any repeats of each feature of the same composition are excluded, the remaining features may account for at least 5%, 10%, or 20% of the total number of features).

In any array 12 the features 16 may be spaced apart by a distance greater than 0 and less than 70%, 60% 50%, 25%, or 10% of a maximum dimension of the feature. Further, the features may have a maximum dimension of between 20 (or 50) to 100 (or 80) microns and are spaced apart by less than 130 microns (or by less than 100 or 50 microns). Various feature densities on the substrate surface are possible. For example, features having a maximum dimension greater than any of the foregoing figures may be present on the surface of at least 30 features/mm$^2$, 40 features/mm$^2$, or 60 features/mm$^2$. While round features 16 are shown, various other feature shapes are possible (such as elliptical). The features 16 may also be arranged in other configurations (for example, circular) rather than the rectilinear grid illustrated. Similarly, arrays 12 on a same substrate 10 need not be laid out in a linear configuration.

Each array 12 may cover an area of less than 100 cm$^2$, or even less than 50 cm$^2$, 10 cm$^2$ or 1 cm$^2$. In many embodiments, particularly when substrate 10 is rigid, it may be shaped generally as a rectangular solid (although other shapes are possible), having a length of more than 4 mm and less than 1 m, usually more than 4 mm and less than 600 mm, more usually less than 400 mm; a width of more than 4 mm and less than 1 m, usually less than 500 mm and more usually less than 400 mm; and a thickness of more than 0.01 mm and less than 5.0 mm, usually more than 0.1 mm and less than 2 mm and more usually more than 0.2 and less than 1 mm. When substrate 10 is flexible, it may be of various lengths including at least 1 m, at least 2 m, or at least 5 m (or even at least 10 m). With arrays that are read by detecting fluorescence, the substrate 10 may be of a material that emits low fluorescence upon illumination with the excitation light. Additionally in this situation, the substrate may be relatively transparent to reduce the absorption of the incident illuminating laser light and subsequent heating if the focused laser beam travels too slowly over a region. For example, substrate 10 may transmit at least 20%, or 50% (or even at least 70%, 90%, or 95%), of the illuminating light incident on the front as may be measured across the entire integrated spectrum of such illuminating light or alternatively at 532 nm or 633 nm.

In the case where arrays 12 are formed by the conventional in situ or deposition of previously obtained moieties, as described above, by depositing for each feature a droplet of reagent in each cycle such as by using a pulse jet such as an inkjet type head, interfeature areas 17 will typically be present which do not carry any polynucleotide. It will be appreciated though, that the interfeature areas 17 could be of various sizes and configurations. Each feature 16 carries a predetermined polynucleotide (which includes the possibility of mixtures of polynucleotides). As per usual, A, C, G, T represent the usual four nucleotides. "Link" (see FIG. 3 in particular) represents a linking agent (molecule) covalently bound to the front surface and a first nucleotide, as provided by a method of the present invention and as further described below. The Link serves to functionalize the surface for binding by the first nucleotide during the in situ process. "Cap" represents a capping agent. The Link may be any of the "second silanes" referenced in U.S. Pat. No. 6,444,268 while the Cap may be any of the "first silanes" in that patent. However, different linking layer compositions than those silanes could be used. As already mentioned, the foregoing patents are incorporated herein by reference, including for example the details of the linking layer compositions used therein.

Substrate 10 also has one or more identifiers 356 each in the form of a bar code. Identifiers 356 may be associated with an array by being: directly printed onto the substrate 10 or a housing (not shown) carrying substrate 10; printed onto labels attached to substrate 10 or a housing carrying substrate 10; contained in a memory (for example, a solid state memory) attached to substrate 10 or a housing carrying substrate 10; or be provided on a printed label or paper or some other medium or in a memory, any of which is received in or on a same package containing the array unit 15 (and therefore also containing substrate 10). Identifiers such as other optical or magnetic identifiers could be used instead of bar codes, and which will carry the information discussed below. Each identifier may be associated with its corresponding array by being positioned adjacent that array 12 on the same substrate 10. However, this need not be the case and identifiers 356 can be positioned elsewhere on substrate 10 if some other means of associating each identifier 356 with its corresponding array is provided (for example, by relative physical locations). Further, a single identifier might be provided which is associated with more than one array 12 on a same substrate 10 and such one or more identifiers may be positioned on a leading or trailing end of substrate 10. Each identifier 356 may also be associated with an array by being in or on a same package or kit which contained by the array and is received by a user. The substrate may further have one or more fiducial marks 18 for alignment purposes during array fabrication or reading.

FIGS. 2 and 3 illustrate ideal features 16 of an array 12 where the actual features formed are the same as the target (or "aim") features, with each feature 16 being uniform in shape, size and composition, and the features being regularly spaced. Such an array when fabricated by drop deposition methods, would require all reagent droplets for each feature to be uniform in shape and accurately deposited at the target feature location. In practice, such an ideal result may be difficult to obtain due to fixed and random errors during fabrication.

Arrays 12 may be fabricated by drop deposition methods such as described in U.S. Pat. No. 6,180,351, U.S. Pat. No. 6,242,266, U.S. Pat. No. 6,306,599, and U.S. Pat. No. 6,420,180. As mentioned above, the foregoing references are incorporated herein by reference particularly as relates to the in situ fabrication apparatus and methods disclosed therein. Alternatively, arrays 12 can be fabricated by known light directed synthesis methods.

Figure 5:
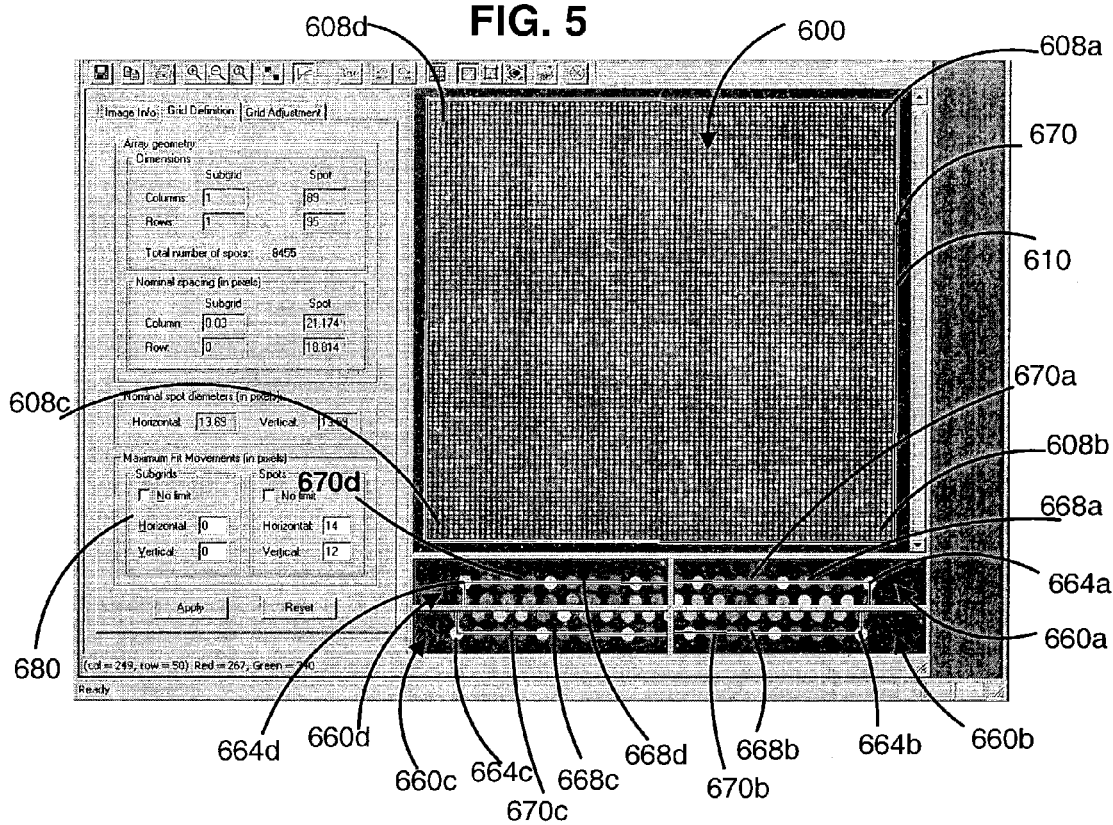
FIG. 5 is a screen shot showing operation of one embodiment of a method of the present invention.

Referring now to FIG. 5, a method of the present invention as implemented on a suitably programmed computer is illustrated. Numbers in parentheses reference the events shown in FIG. 5. In the illustrated method an array unit 15 and its associated identifier 356 is received (400). The identifier 356 associated with the array 12 of the received array unit 15 is read (410). The array layout for the array 12 is retrieved (420) using the read identifier. This can be retrieved from a local or remote database in a memory and in which are saved the array layout and the linked identifier for that array. The array 12 is then read (430) to obtain the full array image (that is, the full resolution image of the entire array). From the retrieved array layout the program determines (440) if the array 12 is a single continuous array or contains a number of sub-arrays. If the array is a continuous array (that is, there are no sub-arrays), then a complete image of the array is presented (460) on a display. If however the array includes sub-arrays then the program waits until it has received (450) a user selection (such as from a point and click device) of one of the sub-arrays. In this situation, a complete image of the selected sub-array is presented (460) on the display instead of a complete image of the entire array. In either event the complete image may occupy up at least 20%, 30%, 40% or 50% of the display area. Magnified images of the corner regions of the displayed complete image are simultaneously presented (470) on the same display with the complete image. Where the array or selected sub-array is rectangular (as is typical) then four magnified images of respective corner regions are displayed. The magnified images may be at least 5, 10, 20, or 30 times magnification of the complete image, and may together occupy at least 20%, 30%, 40% or 50% of the display area.

The program may use the retrieved array layout to generate an expected outline of the array or selected sub-array, and present (475) this expected outline on the display of the complete image and each of the magnified images. Alternatively, a proposed outline could be so presented, the proposed outline being based on any estimation method. The generated and displayed expected (or proposed) outline is an outline in which the expected location of corner points in the complete array or sub-array image are linearly connected. For example, in a rectangular array or sub-array the expected location of the center of the four corner features are linearly connected to provide a rectangular outline which is completely presented on the complete image and only the corners of which are presented on the magnified images. The program then waits to receive (480) a user selection of the actual corners of the array or sub-array. A user makes this selection by any of the means already mentioned. For example, the user may use a point and click device, such as a computer mouse, trackball, keyboard, or the like, to point to and select a center of each corner feature in turn in each of the magnified images. The user may do this by pointing to a corner of the displayed expected outline in a magnified image and dragging and dropping it at the center of the corner feature. Alternatively, the user could enter one or more corner co-ordinates through a keyboard or enter one or more co-ordinates of a line or lines of an expected or proposed outline displayed on the magnified images. In such an operation the program continuously recalculates and presents the modified outline on the complete and magnified images. The magnified images help the user to judge if each of the corner selections is appropriate or any one or more should be modified. When the user signals that they have completed the corner selection (such as by pressing a predefined key on a keyboard or "button" on the display), the net results is that an array or sub-array actual outline has been generated (500) in which the user selected corner points are linearly connected, and which actual outline is presented (520) simultaneously on the displayed complete and magnified images. This actual outline is also saved in a memory (520).

At this point it is determined (530) if there are any sub-arrays not processed. If the array is a complete array with no sub-arrays (which information is provided by the retrieved array layout) then this determination will be negative and feature locations within the full array image can be determined (540) based on the actual outline. If the array has sub-arrays this determination is made simply by checking if an actual outline for each sub-array has been determined. If there are still sub-arrays for which no actual outline has been determined (that is, the determination is positive), the user is prompted on the display to select another sub-array which selection is then received (450) and indicated on the display.

The cycle 450–530 is repeated until all the sub-arrays have been processed (that is, an actual outline for each has been determined). Feature locations are then determined (540) in the sub-arrays of the full array image based on the actual outline for each sub-array. Alternatively, the feature locations could be determined (620) in the sub-array of the full image during each cycle (for example, 620 could be between 600 and 610). This determination of feature locations can be performed by generating a grid of imaginary lines from the selected actual array corner locations, and the expected feature spacings obtained from the retrieved array layout. Such a grid can be generated and used to determine feature locations and extract features, in a manner described in U.S. patent applications Ser. No. 10/077,446 titled "Method And System For A Range Of Automatic, Semi-Automatic, And Manual Grid Finding During Feature Extraction From Molecular Array Data", and Ser. No. 09/589,046 "Method And System For Extracting Data From Surface Array Deposited Features". As mentioned above, these references are incorporated herein by reference.

Figure 4:
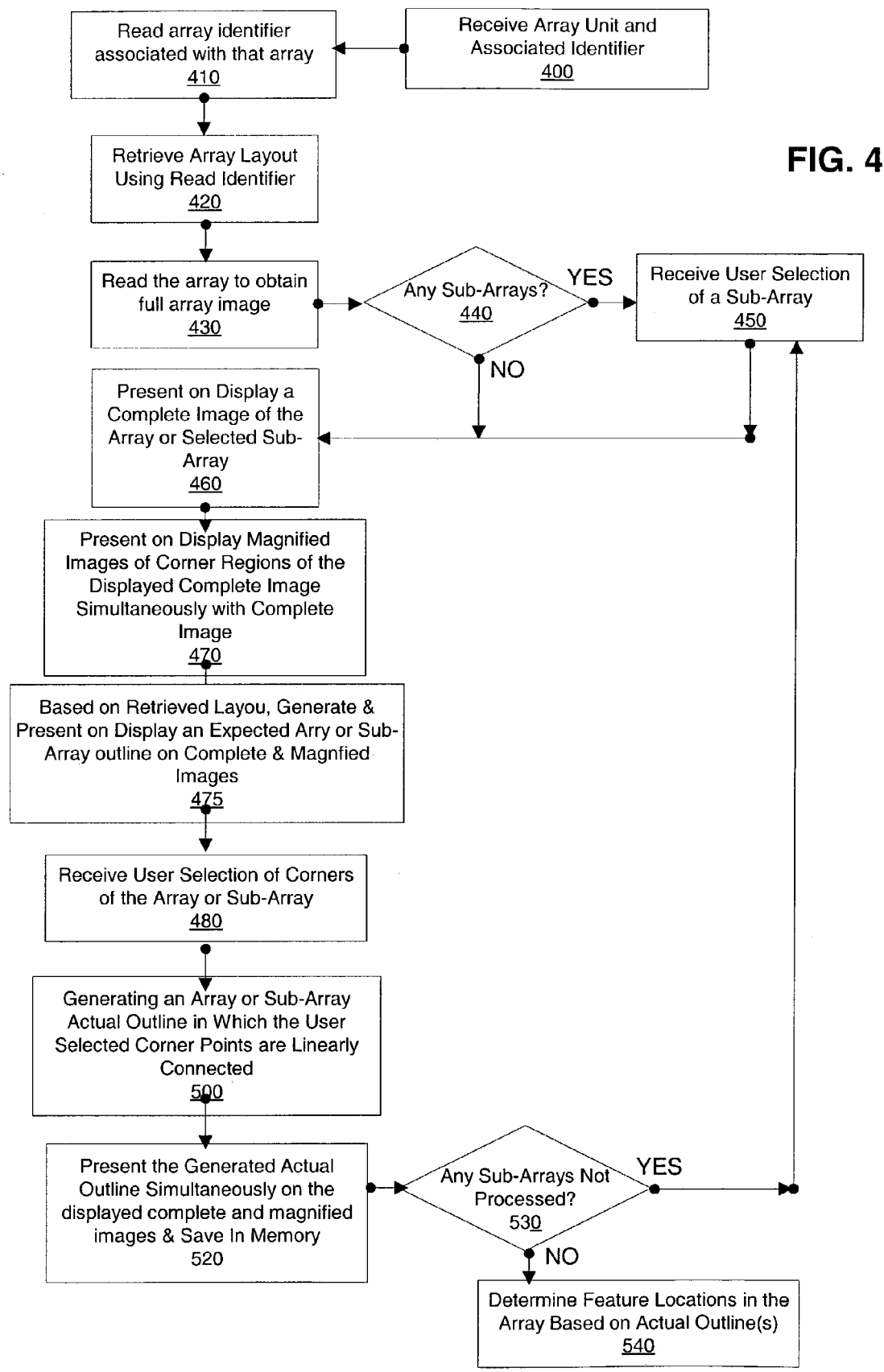
FIG. 4 is a flowchart illustrating a method of the present invention.

Referring now to FIG. 5, an implementation of a method of the present invention can be further understood with reference to that screen shot (a "screen shot" being a picture of a display driven by the computer as would be viewed by a user of the method). In FIG. 5 a complete image 600 of a continuous array is presented to the user on the display. The complete image 600 shows the result from reading an array 12 which has been previously exposed to a sample. It will be assumed that in accordance with FIG. 4 the program has already determined from the retrieved array layout that the array is a single continuous array and has no sub-arrays. Accordingly, the program has already determined an expected array layout which is presented on the complete image 600 as the perimeter of a polygon (in particular, as a rectangle in FIG. 5). Corner regions 608a, 608b, 608c, 608d are magnified and presented as the magnified images 660a, 660b, 660c, 660d on the same display simultaneously with the complete image 600. The magnified images 608 also include the expected array outline 610 on the complete image 600, which can be seen as expected array outline portions 668a, 668b, 668c, 668d in the respective magnified images 660. Based on the previous determination that the complete image 600 is that of a continuous single array, the program has activated only region 680 on the display in which information on the position of the outline (expected outline initially, then actual as modified by the user) is presented. A user can select array corners 664a, 664b, 664c, 664d (which are points) by pointing and clicking at those locations within each of the magnified images 660 in turn. As mentioned, an actual array outline 670 is calculated and displayed simultaneously on the complete image 600 and magnified images 660. In the situation illustrated in FIG. 5 the expected array outline 670 is coextensive with the actual array outline 670 (note that FIGS. 5–8 reference these outlines as "grids").

Figure 6:
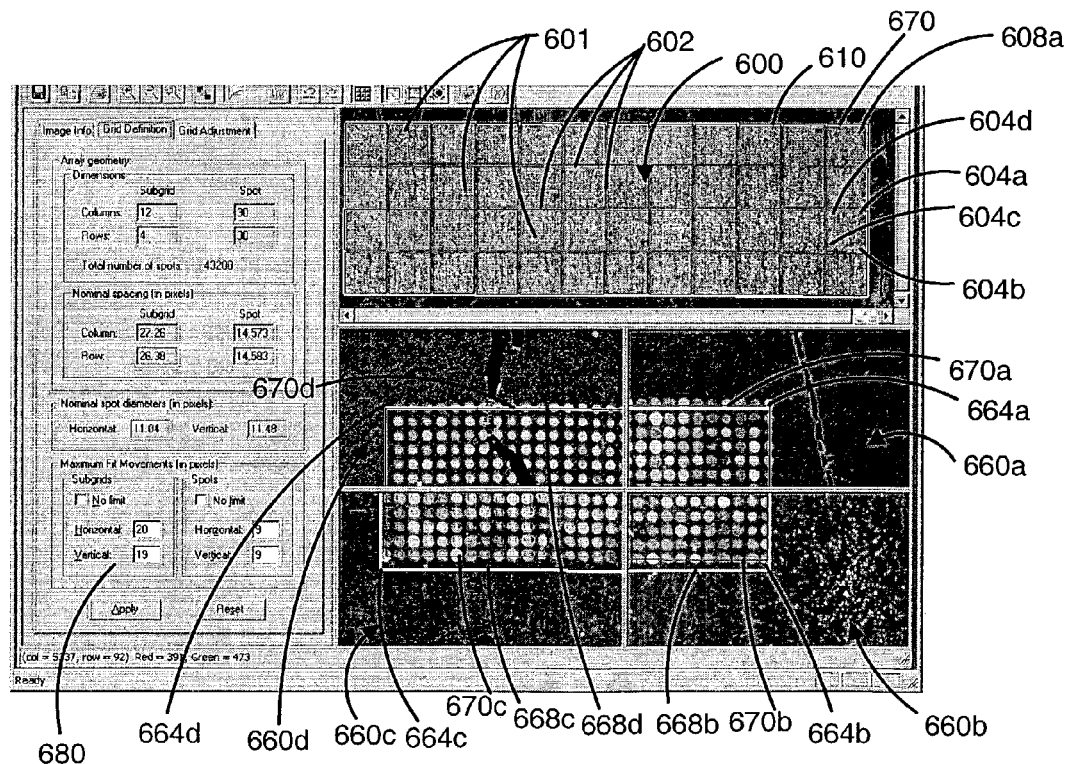
FIGS. 6 through 8 are screen shots illustrating operation of another embodiment of a method of the present invention.
Figure 7:
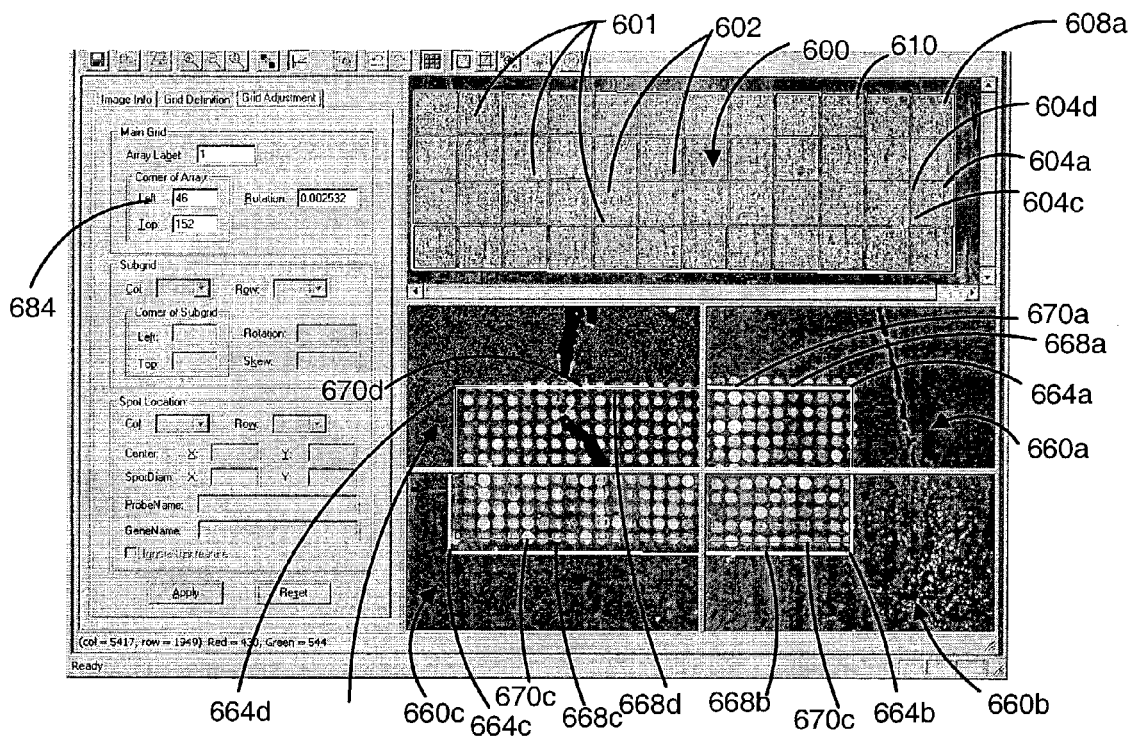
Figure 8:
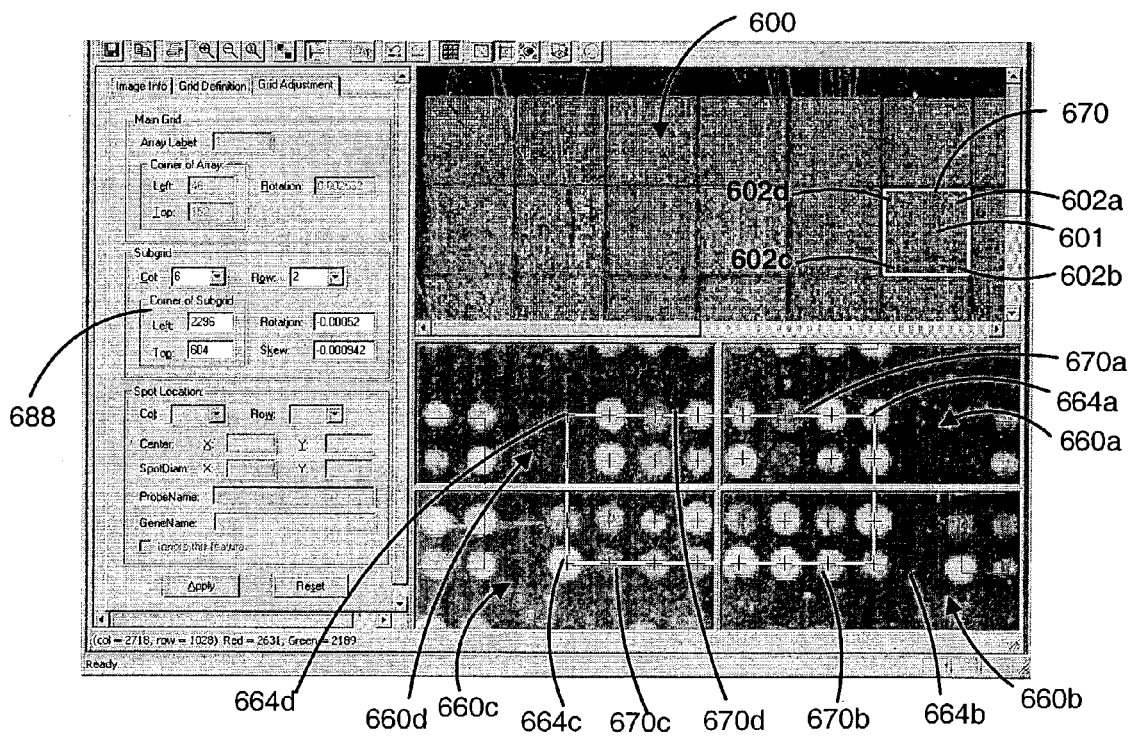

FIGS. 6–8 are similar to FIG. 5 but illustrate the display when the complete image 600 is that of an array containing multiple sub-arrays 601. Note that the sub arrays 601 are separated by a space 602 which is greater than the fixed inter-feature spacing within the sub-arrays 101. Thus, sub-arrays 601 are distinct. As mentioned above, the program would have already determined that complete image 600 is an image of an array containing multiple sub-arrays, and first presents the user with an opportunity to adjust the position of the expected array outline in a same manner as in FIG. 5. Changes in outline position (between expected and actual) are displayed in region 684 of the display as best seen in FIG. 7. Note that as shown in FIGS. 6 and 7, the actual array outline 670 is somewhat different in position from the expected array outline 668 at least in two of the magnified images 668b, 668c. After receiving a user indication that selection of the actual array outline is complete, a selection of a sub-array is received from the user by the user either making an entry in the now-activated region 688 of the display (see FIG. 8) or by pointing and clicking on a sub array 601 in the complete image 600. An expected sub-array outline 668 (not shown in FIG. 8) may then be determined and presented on the complete image 606 of the selected sub-array 601. Corner regions 602a, 602b, 602c, 602d (FIG. 8) of the selected sub-array 601 are then displayed as the respective magnified images 660a, 660b, 660c, 660d in FIG. 8 and a selection of corners 664a, 664b, 66c, 664d are received from the user and an actual sub-array outline 670 calculated and simultaneously displayed in complete image 600 and magnified images 660, all in a same manner as with the array outline 670 described in connection with FIG. 5 or 6.

Figure 9:
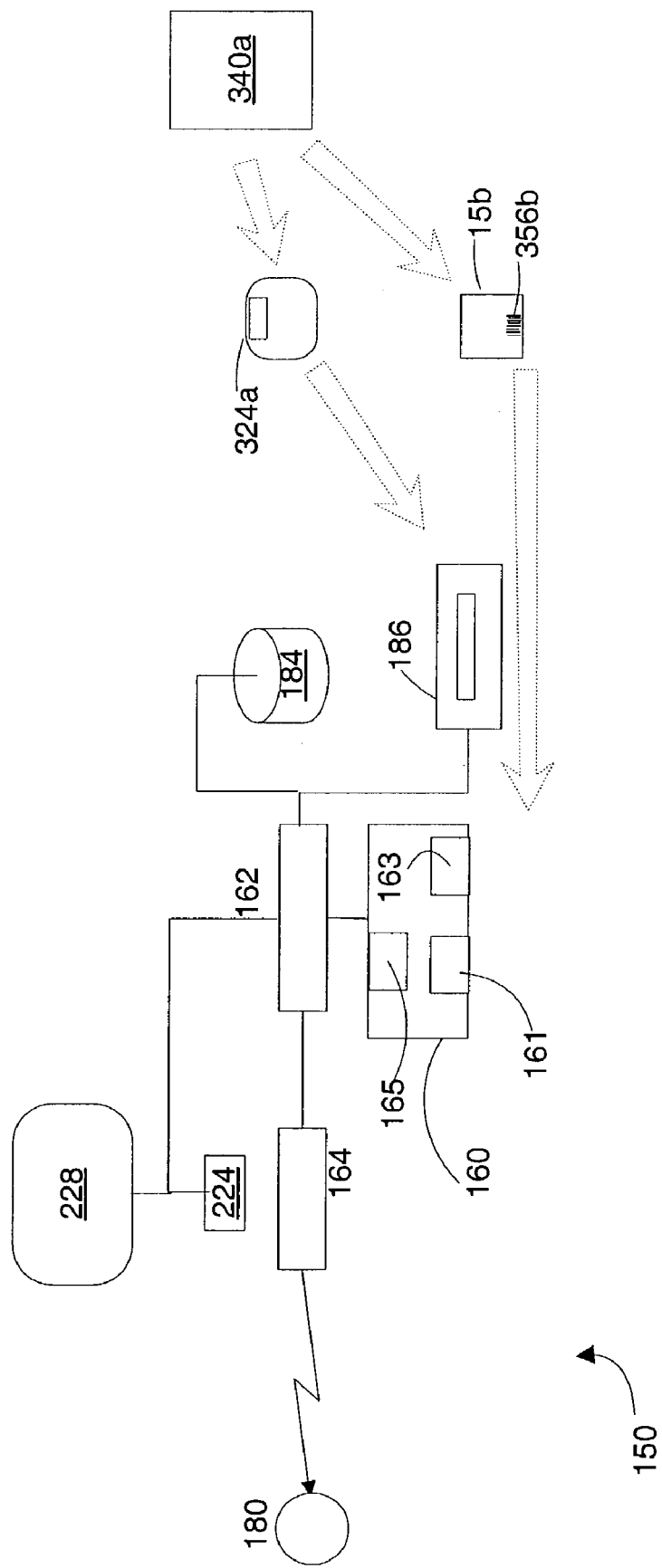
FIG. 9 (4) illustrates an apparatus of the present invention and its use.

Referring now to FIG. 9, an apparatus of the present invention is illustrated in the form of an array reading station 150 for processing an array 12. Such a reading station 150 may be remote from a fabrication station at which the array to be processes was fabricated. The reading station 150 includes a memory 184, an array reader 160 which can read an array, data writer/reader 186, a communication module 164 which also has access to communication channel 180, and a computer 162 communicating with and controlling each of the foregoing. Data writer/reader 186 may be any suitable device which can at least read (and optionally also write onto) a portable magnetic, optical, or solid state memory (such as a magnetic diskette, optical CD or DVD disk, or memory chip). Communication module 164 may be any type of suitable communication module, such as a telephone modem, LAN or WAN card, satellite modem, optical modem, or otherwise. Computer 162 can be programmed from any computer readable medium carrying a suitable computer program. For example, such a medium can be a memory device read by writer/reader 186 or may be programmed from a remote location through communication channel 180. Array reader 160, processor 162, module 164, memory 184, and data writer/reader 186 are also generally local to one another but any combination of one or more of them could be remote from the others or they could all be remote from one another.

Array reader 160 may include a holder 161 which receives and holds an array unit 15, as well as a source of illumination (such as a laser) and a light sensor 165 to read fluorescent light signals from respective features on the array. Reader 160 can be any suitable apparatus for reading an array, such as one which can read the location and intensity of fluorescence at each feature of an array following exposure to a fluorescently labeled sample. An array reader 160 may be a scanner which scans one or more illuminating laser beams across each array in raster fashion and any detects any resulting fluorescent signals, such as described in U.S. Pat. No. 6,406,849. One such scanner that may be used for this purpose is the AGILENT MICROARRAY SCANNER manufactured by Agilent Technologies, Palo Alto, Calif. However, arrays may be read by any other method or apparatus than the foregoing, with other reading methods including other optical techniques (for example, detecting chemiluminescent or electroluminescent labels) or electrical techniques (where each array feature is provided with an electrode to detect hybridization at that feature in a manner disclosed in U.S. Pat. No. 6,251,685, U.S. Pat. No.

6,221,583 and elsewhere). Reader 160 also includes an identifier reader 163 to read an identifier, such as identifier 356, appearing on each array unit 15 to be read. Identifier reader 163 may automatically read each array identifier as that array is loaded into reader 160 or it may be a manually operated wand or the like which an operator passes over each identifier 356. The scanning components of scanner 160, holder 161, and reader 163 are generally all local to one another and may all be contained within the same housing of a single same apparatus. FIG. 9 also illustrates a user station which includes a display 228 and user input device 224

A user may receive a package 340a at a user station, which may be the same location as the reader station 150 or not (but may be remote or local to it). Package 340 contains an array unit and optionally a portable memory 324 a (such as a disk) in package 340a only. A "package" in this context is one or more array units optionally with other items, all held together (such as by a common wrapping or protective cover or binding). Normally the common wrapping will also be a protective cover (such as a common wrapping or box) which will provide additional protection to the substrate 10 from exposure to the external environment. In the case of just a single array unit the package may be that array unit with some protective covering over the array 12 and substrate 10 (which protective cover may or may not be an additional part of the array unit 15 itself).

The user exposes each array 12 on the array unit 15 to a sample, for example a test sample derived from a human or other organism or source. Samples can be prepared for exposure to an array 15 using methods such as described in U.S. Pat. No. 6,235,483 or U.S. Pat. No. 6,132,997. Array washing and drying can be accomplished in a known manner. At some point the user will record the identifier 356 on the substrate 10 of the array unit 15 to which they exposed samples. This can be done automatically by identifier reader 163 when an array unit 15 is to be loaded into holder 161. Computer 162 uses the read identifier to retrieve array layout information from a remote or local database in which the array layout is saved along with the linked identifier. If the database is remote communication module 164 may be used for this purpose. A local database may be saved on disk 324a.

As mentioned, computer 162 is programmed to execute a method of the present invention as already described above, using the other components of the reader station 150. Feature locations can be determined according to a method of the present invention as already described to obtain results from the reading. The results from the reading may be relatively "raw" results in which, for example, total intensity values at each feature are provided, or may be processed results in which, for example, an assessment is made if one or more targets is present in a sample or whether an organism from which the sample was obtained exhibits a particular condition (for example, cancer). The results of the reading (processed or not) may be transmitted to a remote location at which they are received, and can be re-transmitted to elsewhere from that location as desired.

Various and modifications to the particular embodiments described above are, of course, possible. Accordingly, the present invention is not limited to the particular embodiments described in detail above.

What is claimed is:

1. A computer implemented method of determining feature locations in an array image obtained from reading a chemical array comprising multiple features arranged in a polygon and which array optionally includes sub-arrays within the array, the method comprising:

(a) presenting on a display a complete image of the array or a sub-array;
(b) presenting on the display magnified images of corner regions of the displayed complete image simultaneously with the complete image;
(c) receiving a user selection of corners for the array or sub-array and generating an array or sub-array actual outline by linearly connecting the user selected corners;
(d) presenting the generated actual outline simultaneously on the displayed complete and magnified images; and
(e) after step (d) determining feature locations in the array or sub-array image based on the actual outline.

2. A method according to claim 1 additionally comprising, prior to (c) through (e): (i) reading an identifier associated with the array; (ii) retrieving an array layout based on the read identifier; and (iii) generating, based on the array layout, an array or sub-array expected outline in which the expected location of corners of the array image or sub-array image are linearly connected; (iv) presenting the expected outline simultaneously on the displayed complete and magnified images.

3. A method according to claim 2 wherein (e) comprises generating a grid based on the actual outline and retrieved array layout and selecting locations in relation to the grid as feature locations.

4. A method according to claim 2 wherein the array comprises at least one sub-arrays and the method additionally comprises: receiving a user selection of a sub-array prior to (iii); and repeating (a) through (e) for each sub-arrays.

5. An apparatus for determining feature locations in an array image obtained from reading a chemical array comprising multiple features arranged in a polygon and which array optionally includes sub-arrays within the array, the apparatus comprising: an identifier reader to read an identifier associated with the array; and a computer programmed to execute a method of claim 4.

6. An apparatus for determining feature locations in an array image obtained from reading a chemical array comprising multiple features arranged in a polygon and which array optionally includes sub-arrays within the array, the apparatus comprising: an identifier reader to read an identifier associated with the array; and a computer programmed to execute a method of claim 2.

7. A computer program product comprising a computer readable medium carrying a computer program code which performs the method of claim 2.

8. A method according to claim 1 wherein the user selection is received from a point and select device.

9. A method according to claim 1 wherein the array includes sub-arrays, the method additionally comprising, prior to (c) and (d): (i) reading an identifier associated with the array; (ii) retrieving an array layout based on the read identifier; and(iii) generating, based on the array layout, a sub-array expected outline in which the expected location of corners of the sub-array image are linearly connected; (iv) presenting the expected outline simultaneously on the displayed complete and magnified images; (v) following (d) repeating (iii) and (iv) and (a) through (d), for one or more sub-arrays in turn.

10. A method according to claim 1 wherein the array includes sub-arrays, the method additionally comprising receiving a user selection of one of the sub-arrays prior to (c) through (e).

11. A method according to claim 1 additionally comprising reading the array.

12. A method according to claim 1 additionally comprising extracting feature data from the image based on the determined feature locations.

13. A method comprising transmitting a result obtained from the method of claim 12 to a remote location.

14. A method according to claim 1 wherein the array image is obtained from reading a chemical array comprising multiple features arranged in rows and columns.

15. A method comprising receiving a result obtained from the method of claim 14 from a remote location.

16. A computer program product comprising a computer readable medium carrying a computer program code which performs the method of claim 14.

17. An apparatus for determining feature locations in an array image obtained from reading a chemical array comprising multiple features arranged in a polygon and which array optionally includes sub-arrays within the array, the apparatus comprising a computer programmed to execute a method of claim 1.

18. An apparatus according to claim 17 additionally comprising an array reader to read the array.

19. A computer program product comprising a computer readable medium carrying a computer program code which performs the method of claim 1.

* * * * *